US010865288B2

(12) United States Patent
Manning et al.

(10) Patent No.: US 10,865,288 B2
(45) Date of Patent: Dec. 15, 2020

(54) LOW PHOSPHORUS LOW COLOR POLYAMIDES

(71) Applicant: Ascend Performance Materials Operations LLC, Houston, TX (US)

(72) Inventors: Steven C. Manning, Pensacola, FL (US); Roger C. Ayotte, Pensacola, FL (US)

(73) Assignee: ASCEND PERFORMANCE MATERIALS OPERATIONS LLC, Houston, TX (US)

( * ) Notice: Subject to any disclaimer, the term of this patent is extended or adjusted under 35 U.S.C. 154(b) by 0 days.

(21) Appl. No.: 15/314,837

(22) PCT Filed: Mar. 19, 2015

(86) PCT No.: PCT/US2015/021562
§ 371 (c)(1),
(2) Date: Nov. 29, 2016

(87) PCT Pub. No.: WO2015/183385
PCT Pub. Date: Mar. 12, 2015

(65) Prior Publication Data
US 2017/0107349 A1    Apr. 20, 2017

Related U.S. Application Data

(60) Provisional application No. 62/005,813, filed on May 30, 2014.

(51) Int. Cl.
C08K 3/32 (2006.01)
C08L 77/06 (2006.01)
C08K 5/09 (2006.01)
C08K 5/098 (2006.01)

(52) U.S. Cl.
CPC .................. *C08K 3/32* (2013.01); *C08K 5/09* (2013.01); *C08K 5/098* (2013.01); *C08L 77/06* (2013.01); *C08K 2003/329* (2013.01)

(58) Field of Classification Search
CPC ....... C08K 3/32; C08K 5/09; C08K 2003/329
USPC .................................. 524/414, 147, 133
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton |
| 2,919,258 A | 12/1959 | Pietrusza et al. |
| 3,080,345 A | 3/1963 | Brooks et al. |
| 3,173,898 A | 3/1965 | Men Sum |
| 3,393,210 A | 7/1968 | Speck |
| 3,585,264 A | 6/1971 | Thomas |
| 3,691,131 A | 9/1972 | Kelmchuk |
| 3,860,558 A | 1/1975 | Kelmchuk |
| 4,031,164 A | 6/1977 | Hedrick et al. |
| 4,218,365 A | 8/1980 | Ridgway et al. |
| 4,237,034 A | 12/1980 | Tomka et al. |
| 4,320,213 A | 3/1982 | Woodbrey et al. |
| 4,346,200 A | 8/1982 | Woodbrey |
| 4,704,330 A | 11/1987 | Moore et al. |
| 4,707,513 A | 11/1987 | Baer |
| 4,713,415 A | 12/1987 | Lavengood et al. |
| 4,791,027 A | 12/1988 | Reimann et al. |
| 4,866,115 A | 9/1989 | Betz et al. |
| 4,935,272 A | 6/1990 | Leboeuf |
| 4,981,906 A | 1/1991 | Tomono et al. |
| 5,654,355 A | 8/1997 | Kurian et al. |
| 5,683,817 A * | 11/1997 | Kenmochi .......... B29C 45/0001 264/176.1 |
| 5,925,300 A | 7/1999 | Kurian et al. |
| 5,929,200 A | 7/1999 | Pagilagan |
| 6,087,427 A | 7/2000 | Boydell et al. |
| 6,197,855 B1 * | 3/2001 | Lysek .................. C07C 253/34 524/133 |
| 6,515,058 B1 | 2/2003 | Tomiyama et al. |
| 7,491,763 B2 | 2/2009 | Aramaki et al. |
| 7,687,562 B2 | 3/2010 | Maruyama et al. |
| 7,858,172 B2 | 12/2010 | Imaizumi et al. |
| 8,192,664 B2 | 6/2012 | Polk, Jr. et al. |
| 8,501,900 B2 | 8/2013 | Buzinkai et al. |
| 8,658,757 B2 | 2/2014 | Uehira et al. |
| 2002/0010238 A1 | 1/2002 | Ogoe |
| 2003/0045621 A1 | 3/2003 | Aramaki et al. |
| 2006/0014244 A1 | 1/2006 | Chun et al. |
| 2006/0142443 A1 * | 6/2006 | Aramaki ................. C08K 3/32 524/115 |

(Continued)

FOREIGN PATENT DOCUMENTS

| | | |
|---|---|---|
| CN | 101163746 | 4/2008 |
| CN | 101432365 A | 5/2009 |

(Continued)

OTHER PUBLICATIONS

Extended European Search Report issued in corresponding European Patent Application No. 15800525.6 dated Jan. 2, 2018.
Search Report issued in corresponding Singapore Patent Application No. 11201609952S dated Nov. 3, 2017.
Written Opinion issued in corresponding Singapore Patent Application No. 11201609952S dated Dec. 5, 2017.
International Search Report and Written Opinion dated Jun. 19, 2015 in corresponding PCT/US2015/021562 application.
Third Party Observation filed in corresponding Japanese Patent Application No. 2017-515668 dated Oct. 30, 2018.
Office Action issued in corresponding Chinese Patent Application No. 201580033313.X dated Apr. 24, 2018.

(Continued)

*Primary Examiner* — Doris L Lee
(74) *Attorney, Agent, or Firm* — Cozen O'Connor

(57) ABSTRACT

The present invention provides a low-phosphorus polyamide compound and a process for preparing such a polyamide.

10 Claims, 10 Drawing Sheets

(56) References Cited

U.S. PATENT DOCUMENTS

| | | |
|---|---|---|
| 2009/0069471 A1 | 3/2009 | Terada et al. |
| 2009/0149590 A1 | 6/2009 | Eroshov et al. |
| 2010/0036083 A1 | 2/2010 | Fink et al. |
| 2010/0120961 A1 | 5/2010 | Tanaka et al. |
| 2012/0010871 A1 | 1/2012 | Ichimi |
| 2012/0108710 A1* | 5/2012 | Schwiegk ............... D01F 1/10 524/99 |

FOREIGN PATENT DOCUMENTS

| | | |
|---|---|---|
| CN | 102471483 | 5/2012 |
| EP | 1698667 A1 | 9/2006 |
| EP | 1870436 A1 | 12/2007 |
| EP | 2724860 A1 | 4/2014 |
| JP | 08-59824 A | 3/1996 |
| JP | H08-502548 A | 3/1996 |
| JP | 09512839 | 12/1997 |
| JP | 2003-291938 A | 10/2003 |
| JP | 2005-194329 A | 7/2005 |
| JP | 2005-194330 A | 7/2005 |
| JP | 2007-031475 A | 2/2007 |
| JP | 2008-023779 A | 2/2008 |
| JP | 4739211 | 5/2011 |
| JP | 2013501848 | 1/2013 |
| JP | 2016-514751 A | 5/2016 |
| TW | 200535192 | 11/2015 |
| WO | 95/22577 A1 | 8/1995 |
| WO | 99/61522 A1 | 12/1999 |
| WO | 2006/097678 A1 | 9/2006 |
| WO | 2006/112058 A1 | 10/2006 |
| WO | 2011/019604 A1 | 2/2011 |

OTHER PUBLICATIONS

Brazilian Application No. 112016027990-5, Office Action dated Feb. 11, 2020, 4 pages.
Japanese Application No. 2017-515668, Office Action dated Apr. 9, 2019, 4 pages (4 original pages and 3 translation pages).
Japanese Application No. 2017-515668, Office Action, dated Nov. 13, 2018, 9 pages (5 original pages and 4 translation pages).
Japanese Application No. 2019-144487, Office Action, dated Jul. 16, 2020, 12 pages (6 original pages and 6 translation pages).
Japanese Application No. 2019-515668, Office Action, dated Jul. 17, 2020, 12 pages (3 original pages and 2 translation pages).
International Application No. PCT/US2015/021562, International Preliminary Report on Patentability dated Dec. 15, 2016, 7 pages.
Taiwan Application No. 104111698, Office Action dated Jun. 24, 2019, 8 pages (5 original pages and 3 translation pages).

* cited by examiner

LOW PHOSPHORUS LOW COLOR POLYAMIDES

BACKGROUND OF THE INVENTION

Polyamide resins and means for their preparation are well known. When manufactured according to conventional processes but in the absence of conventional pigments, these resins tend to exhibit varying degrees of undesired yellowness, with the yellowness increasing over time. Polyamide resins also generally exhibit increased yellowness when exposed to the high temperatures associated with subsequent commonly employed melt processing operations. Since many of these polyamide resins are stored for extended periods of time and in view of the potential for repeated cycles of melting during molding and extrusion, there is an incentive to provide improved polyamide resins which initially show low color and which continue to show low color over time.

Phosphorus-containing compounds are well known catalysts for polymerization of polyamides. Notably, the use of these compounds results in polyamides having a greater degree of whiteness and color stability, presumably by reducing the degree of oxidative and thermal degradation of the polyamide. See, e.g., U.S. Pat. No. 5,929,200. More particularly, hypophosphite compounds have been used as catalysts for polymerization of the polyamides, as described in, for example, U.S. Pat. Nos. 3,860,558; 3,173,898; and 3,691,131.

The addition of phosphorus-containing compounds to polyamides such as nylon 6,6 serve as color stabilizers for the polyamides. However, these compounds also serve as polymerization catalysts and sometimes as nucleating agents. See, e.g., U.S. Pat. Nos. 6,197,855; and 4,237,034. Nucleants have often been used to improve the molding cycle time or crystallization rate of polyamides. For example, U.S. Pat. No. 3,080,345 discloses using as a nucleating agent sodium phenylphosphinate, sodium isobutylphosphinate, magnesium oxide, mercuric bromide, mercuric chloride, cadmium acetate, lead acetate, or phenolphthalein. U.S. Pat. Nos. 3,585,264 and 4,866,115 also disclose using nucleating agents for improving the rate of crystallization of polyamides. U.S. Pat. No. 6,197,855 discloses the incorporation of nylon 2,2 and a phosphorouscontaining whitening agent into the polyamide before, during or after the polycondensation step. Preferably, the phosphorous-containing whitening agent is added during the polycondensation step to result in a white polymer.

Persistent problems, however, attributed to the use of phosphorus-containing compounds include viscosity build during injection molding and deposits formed in process/polymerization equipment during manufacturing.

The present invention is directed to (i) the use of low phosphorus content for the purpose of improving color, catalytic activity, and low deposit/plate out, (ii) end group configuration designed to maximize injection molding productivity; and (iii) application of a metal-containing compound to the outside of the polyamide (typically in pellet form) after polymerization, but before injection molding to reduce the catalytic activity of the phosphorus-containing compound during injection molding, while preserving the integrity of the catalytic behavior of the phosphorus-containing compound during polymerization.

The present invention reflects the unexpected discovery that the use of phosphorus-containing compounds in amounts conventionally thought to be too low to be effective protection against yellowing are surprisingly effective in preparing low color polyamides, where the low color does not degrade over an extended period of time. These same low levels of phosphorus that provide improvement in color and polymerization rate also mitigate the negative effect of phosphate plate out in the polymerization and processing equipment.

SUMMARY OF THE INVENTION

An aspect of the present invention is a low-color polyamide comprising 25 to 50 ppm of phosphorus, wherein the phosphorus is present as a phosphorus-containing compound.

Another aspect of the invention is a process for preparing a low-color polyamide comprising 25 to 50 ppm of phosphorus.

Another aspect of the invention is an article comprising a low-color polyamide comprising 25 to 50 ppm of phosphorus.

In an aspect of the invention, the low-color polyamide comprises 25 to 45 ppm, such as 25 to 40 ppm, such as 25 to 35 ppm, such as 25 to 30 ppm of phosphorus.

In an aspect of the invention, the phosphorus-containing compound is selected from the group consisting of hypophosphorus acid, phosphorus acid and their respective salts. Hypophosphorus acid and sodium hypophosphite (SHP) are preferred phosphorus-containing compounds.

In an aspect of the invention, the low-color polyamide further comprises at least one of a metal-containing compound capable of reducing the catalytic effect of the phosphorus-containing compound, especially during injection molding.

In an aspect of the invention, the low-color polyamide further comprises 1,200 to 1,800 ppm of a carboxylic acid, such as a lower carboxylic acid (e.g., acetic acid or propionic acid), phthalic acid, benzoic acid or other compound capable of rendering various end groups of the polyamide inert (i.e., non-reactive).

In an aspect of the invention, the polyamide is selected from the group consisting of nylon 6, nylon 4/6, nylon 6/6, nylon 6/10, nylon 6/12, nylon 11 and nylon 12.

In an aspect of the invention, the polyamide is nylon 6/6 (also referred to herein as nylon 66 or nylon 6,6 or nylon66 or polyamide 66 or PA 66 or PA66).

In an aspect of the invention the low-color polyamide further comprises one or more additives, fillers, reinforcing agents and modifiers.

In an aspect of the invention, the low-phosphorus polyamide comprises 250 to 1,500 ppm, such as 250 to 1,000 ppm, such as 250 to 750 ppm, such as 250 to 500 ppm, such as 500 to 1,500 ppm, such as 500 to 1,000 ppm, such as 500 to 750 ppm of a metal-containing compound.

In an aspect of the invention, the yellow color index ranges from −3 to −9, such as −3 to −8, such as −3 to −7, such as −3 to −6, such as −4 to −9, such as −4 to −8, such as −5 to −9, such as −5 to −8.

In an aspect of the invention, the metal-containing compound is applied to the external surface of a solid form of the polyamide—e.g., after the polyamide has already been processed, wherein the solid form is, for example, a pellet or a flake. Alternatively, the metal-containing compound may be applied internal to the pellet.

In an aspect of the invention, the low-phosphorus polyamide (such as nylon 66) has a specific configuration of end groups, such as, for example, amine end groups, carboxylate end groups and so-called inert end groups including monocarboxylic acids, mono amines, lower dicarboxylic acids capable of forming inert imine end groups, phthalic acids and derivatives thereof). The specific combination of all of these components provides the observed polymerization performance in the form of catalytic activity of the phosphorus-containing compound, the whiteness of the final product, low deposition during polymerization and processing, and improved melt stability during the injection molding process.

BRIEF DESCRIPTION OF THE DRAWINGS

The figures represent exemplary embodiments and are not intended to limit the scope of the present invention as otherwise described herein.

DETAILED DESCRIPTION OF THE INVENTION

Figure 1:
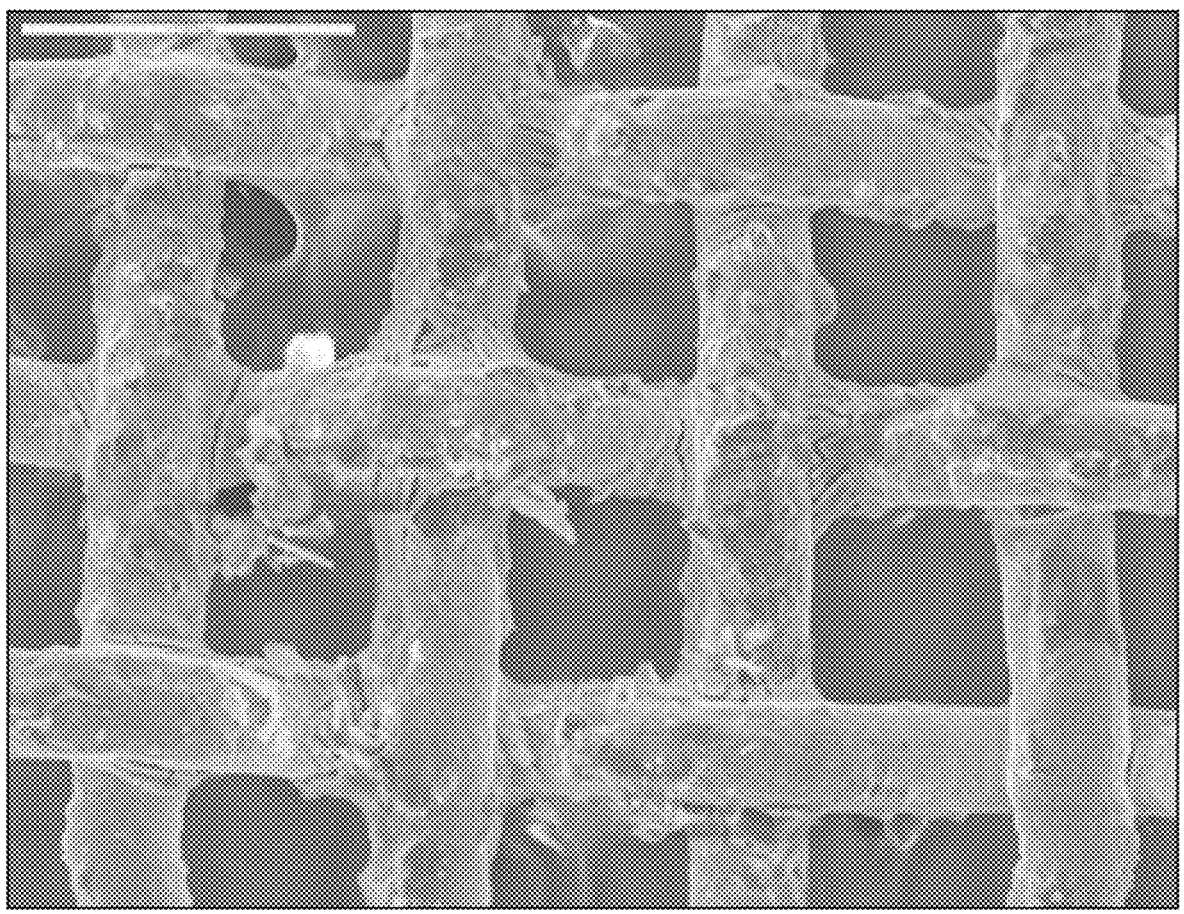
FIG. 1 illustrates a scanning electron microscope image of a filter element containing deposits.

Unless defined otherwise, all technical and scientific terms described herein have the same meaning as commonly understood by one of ordinary skill in the art to which this disclosure belongs.

As described herein, "relative viscosity" or "RV" refers to a comparison of the viscosity of a solution of polymer in formic acid with the viscosity of the formic acid itself and is measured using 90% formic acid and glass capillary Ubbelohde viscometers according to ASTM D789. For samples containing fiberglass or other fillers, the weight of sample to be dissolved is adjusted according to the amount of filler to provide the required 11.0 grams of neat resin per 100 ml formic acid.

As described herein, "low color" refers to a lowering of the yellowness index by 3 to 5 units lower compared to the absence of a phosphorus-containing compound as measured by ASTM 6290. Suitable color determinations can be used as well, as described by the standard, Yellowness Index (YI), CIE X, Y, Z, and Hunter L, a, b, or CIE L*, a*, b*.

Phosphorus concentration ranges of 25-45 ppm with allowance for other ranges, as noted. End groups should be noted to be in the ranges using micro-equivalents (moles per million grams polyamide) and should cover the ranges say 5 to 40 moles per million grams, preferably 15 to 25 micromoles, and most preferably 20-33 moles per million grams of polyamide. The metal content should be described as moles metal per mole of phosphorus.

In an aspect of the invention, the polyamide is selected from the group consisting of nylon 6, nylon 4/6, nylon 6/6, nylon 6/10, nylon 6/12, nylon 11, nylon 12, nylon MXD6, copolymer nylon (a copolymer of caprolactam with hexamethylenediamine adipate), nylon block copolymers, and copolymers comprising these nylons as main components. The general methods of preparation of polyamides such as nylon 6/6 are well known. The low-phosphorus polyamides described herein are prepared by conventional methods known in the art—such as the polycondensation of amino carboxylic acids or of mixtures of diamines and dicarboxylic acids including interpolyamides obtained by the polycondensation of different polyamide forming components. See, e.g., U.S. Pat. Nos. 6,197,855; 4,981,906; 4,320,213; 4,346,200; 4,713,415; 4,031,164; 2,071,250; 2,071,251; 2,130,523; 2,130,948; 2,241,322; 2,312,966; 2,512,606; and 3,393,210.

Suitable phosphorus-containing compounds include hypophosphorus acids, phosphorus acid, and their corresponding salts. Preferred phosphorus-containing compounds include hypophosphorus acid and hypophosphite salts, such as lithium, sodium, potassium, strontium or zinc hypophosphite.

Multivalent metal-containing compounds used in the present invention serve as phosphorus catalyst deactivators, with the effect of reducing undesirable increases in the molecular weight of the polyamide during subsequent melt processing operations. The degree of phosphorus catalyst deactivation may be controlled by the amount of the phosphorus-containing compound and the multivalent metal-containing compound added to the polyamide. Suitable multivalent metal-containing compounds are well known to one skilled in the art and include halides, nitrates, and carboxylate salts (e.g., acetates, propionates, benzoates and stearates) of Group IIA metals, zinc and aluminum. A preferred multivalent metal-containing compound is a stearate, such as, for example aluminum distearate or zinc stearate.

Suitable carboxylic acids include acetic acid, propionic acid, benzoic acid, phthalic acid, or succinic acid.

The low-phosphorus polyamide has a relative viscosity (RV) range between 35 and 80, such as between 40 and 80, such as between 40 and 65, such as between 40 and 50.

Conventional injection molding, extrusion molding, blow molding, press molding, compression molding and gas assist molding techniques are generally suitable for molding of the compounded polyamides. See, e.g., U.S. Pat. Nos. 8,658,757; 4,707,513; 7,858,172; and 8,192,664.

The low-color polyamide may be mixed/blended with materials that include but are not limited to, glass fibers (e.g., fiberglass, such as in chopped or roving form), waxes (including, e.g., ethylene bis-stearamide or stearyl erucamide), minerals, carbon fibers, aramide fibers, fiber reinforcement, chain terminators, viscosity modifiers, plasticizers, heat stabilizers, UV stabilizers, colorants (such as, e.g., nigrosine or carbon black), catalysts, other polymers and impact modifiers, flame retardants, delusterants, fillers, antimicrobial agents, antistatic agents, optical brighteners, extenders, processing aids, talc, mica, gypsum, wollastonite and other commonly used additives known to those of skill in the art. Preferably, additives are hydrolysis resistant chopped glass, heat stabilizers (including, e.g., copper heat stabilizers such as CuI or KI) and nucleating agents. Additional suitable additives may be found in *Plastics Additives, An A-Z reference*, edited by Geoffrey Pritchard (1998). The optional addition of a stabilizer to the additive dispersion is present in an exemplary embodiment at between about 0.75% and about 7.5% by total dispersion weight. Stabilizers suitable for the additive dispersion include, but are not limited to, polyethoxylates (such as the polyethoxylated alkyl phenol Triton X-100), polypropoxylates, block copolymeric polyethers, long chain alcohols, polyalcohols, alkyl-sulfates, alkyl-sulfonates, alkyl-benzenesulfonates, alkyl-phosphates, alkyl-phosphonates, alkyl-naphthalene sulfonates, carboxylic acids and perfluoronates.

In exemplary embodiments, the material to be mixed/blended with the polyamide is added to the polyamide as itself (or a salt thereof) or is formed in situ using appropriate reactants. The terms "added" or "addition" without further clarification are intended to encompass either the addition of the material itself to the polymer or the in situ formation of the material in the polyamide. In another embodiment, the material to be mixed/blended with the polyamide is added via masterbatch. In a particular embodiment, a masterbatch containing a low molecular weight carrier polymer and a high concentration of the additive material can be melt blended with the main polyamide source. In an embodiment, the material(s) to be mixed/blended are added to the interior of the polyamide product (e.g., in pellet or flake form), while in another embodiment, the material(s) to be mixed/blended are added exterior to the polyamide product (e.g., in pellet or flake form).

Examples of applications which would benefit from the improvements described herein include articles prepared by injection molding processes, profile extrusion processes, sheet extrusion processes, and other forming processes known to those skilled in the art. These articles may be used in electrical and electronic applications (such as, but not limited to, circuit breakers, terminal blocks, connectors and the like), automotive applications (such as, but not limited to, air handling systems, radiator end tanks, fans, shrouds, and the like), furniture and appliance parts, and wire positioning devices such as cable ties.

Examples/Experimental Results

There are several aspects relating to the use of phosphorus-containing compounds in the production of polyamides. Phosphorus-containing compounds are used to improve color and to act as catalysts to achieve improved polymerization rates. Negative consequences associated with the use of certain phosphorus-containing compounds include the deposition of condensed polyphosphates in polymerization equipment, the lack of RV control during injection molding, and a reduction in the physical properties of articles molded from materials containing these phosphorus-containing compounds.

Thus, the use of a phosphorus-containing compound in the manufacture of polyamides such as nylon requires a balancing between the desired improvement in the color of the polyamide and the undesired toll on the polymerization equipment. Assessment of wear on the polymerization equipment was measured by filter life and the degree of die drooling (i.e., deposits forming adjacent to capillary holes present on die surface). The deposits observed to form on the filter elements and the die holes were identified by X-ray diffraction analysis as pentasodium-tripolyphosphate. FIG. 1 is a scanning electron microscope image of a filter element coated with these triphosphate deposits.

Figure 2:
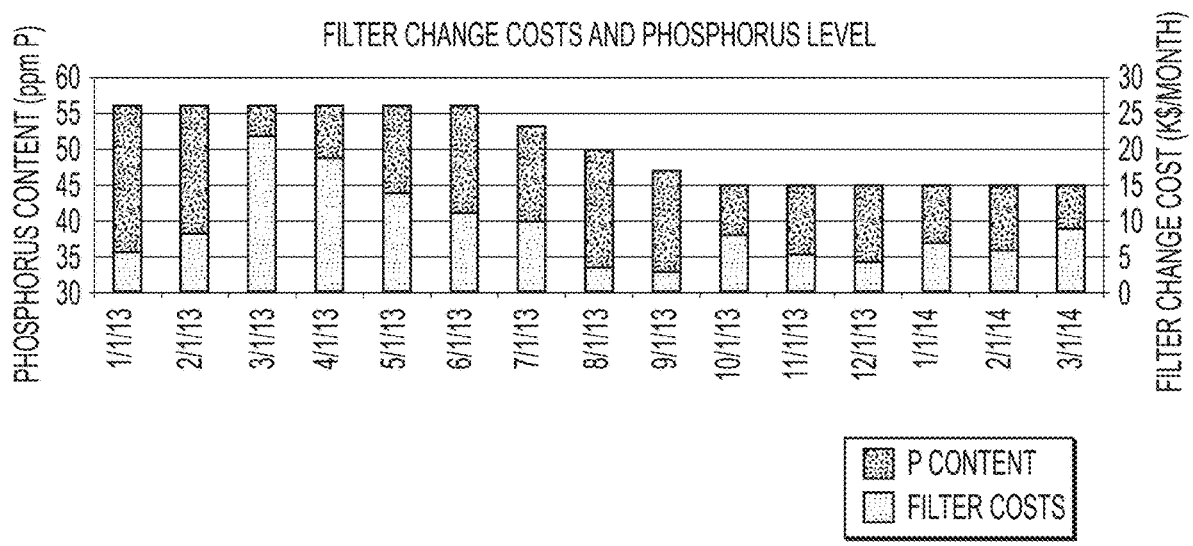
FIG. 2 illustrates the reduced cost of filter changes associated with reduced levels of phosphorus.

It is believed that the presence of this deposit is caused by the condensation of phosphates in the process of preparing the polyamide. A test was conducted where the level of phosphorus was decreased from 60 ppm to 45 ppm and the costs associated with changing the filter element was monitored for 6 months prior to reduction of the phosphorus levels and then monitored for several months subsequent to reduction of the phosphorus levels. A reduction in filter change expenses of approximately 50% was observed. FIG. 2 depicts the monthly average filter change expenses for a polymerization line running polyamides containing phosphorus. Surprisingly, the monthly costs were reduced on average by 50% by reducing the phosphorus levels from an average of about 57 ppm to an average of about 50 ppm from the first half of 2013 to the fourth quarter of 2013 and the first quarter of 2014.

Figure 3:
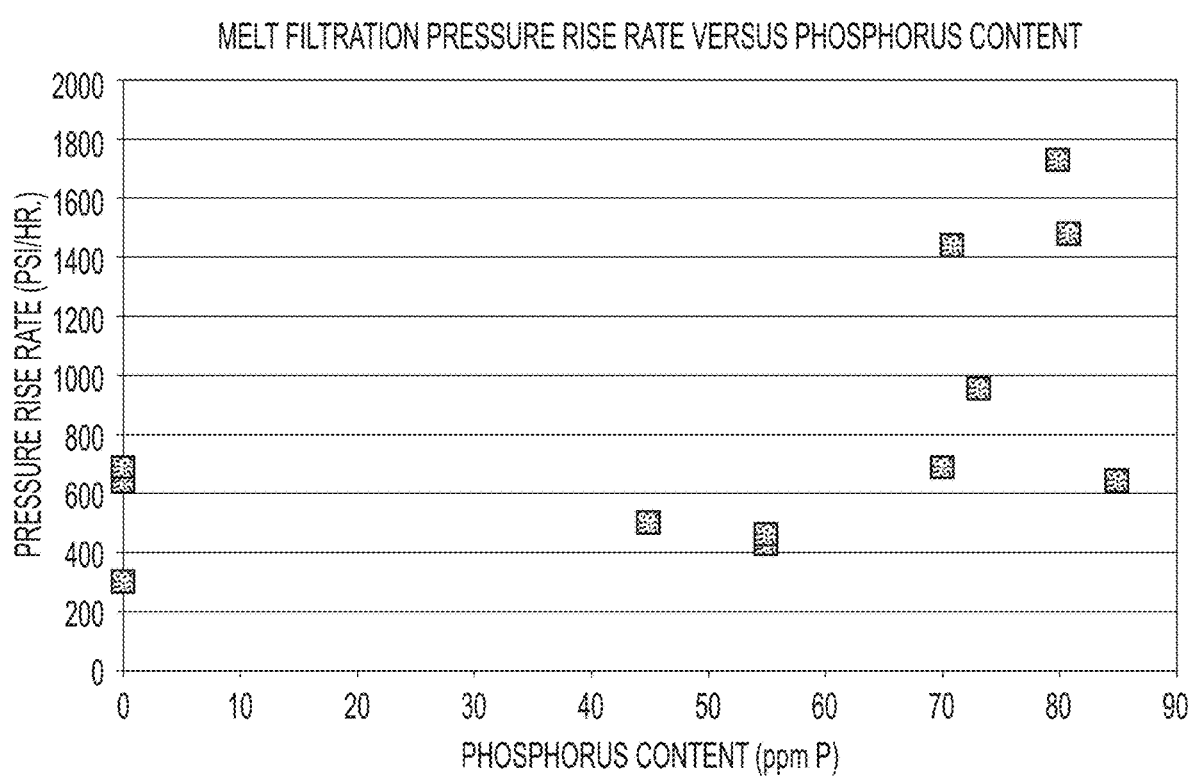
FIG. 3 illustrates a graphical representation of the rise in filter pressure versus increasing phosphorus levels.

The effects of the amount of phosphorus on the undesirable deposition of the phosphate deposits was analyzed by extruding nylon 6,6 through a filter pack and monitoring the rise in filter pressure. A variety of phosphorus levels were tested and the rise in pressure was observed to increase significantly with concentration. See FIG. 3. Thus, there is an upper level of phosphorus content for practical reasons above which will impart negative effects.

Having observed a practical upper limit for phosphorus levels, a lower limit for practical usage for color improvement and process rate was investigated. A laboratory autoclave process was used to produce PA66 samples with different phosphorus levels in order to determine the minimum level of effectiveness for color improvement and for process rate improvement. Table 1 outlines the experimental design, which includes the lab autoclave experiment and additive targets.

TABLE 1

| Polymer Targets | | | Calculated Beaker Addition Amounts (g) | | | | |
| --- | --- | --- | --- | --- | --- | --- | --- |
| [P] (ppm) | [Acetic Acid] (ueq/g polymer) | HMD Spike (μeq/g polymer) | Salt | SHP 5% Solution | Acetic Acid Solution | HMD Solution | Finish Cycle Time (min) |
| 0 | 20 | 30 | 1700 | 0.000 | 3.959 | 5.741 | 35 |
| 22 | 20 | 30 | 1700 | 1.520 | 3.959 | 5.741 | 35 |
| 44 | 20 | 30 | 1700 | 2.759 | 3.959 | 5.741 | 35 |
| 66 | 20 | 30 | 1700 | 3.998 | 3.959 | 5.741 | 35 |

The RV, color (YI), phosphorus level, amine end groups, and acetic acid end groups for the PA66 autoclave batches were measured for each batch and are summarized in Table 2.

TABLE 2

| | Actual Beaker Addition Amounts (g) | | | Flake Analytical Results | | | | |
| --- | --- | --- | --- | --- | --- | --- | --- | --- |
| Batch Number | Salt | SHP 5% Solution | Acetic Acid Solution | RV | NH$_2$ (μeq/g) | Acetic (ppm) | Phosphorus (ppm) | YI |
| 040714C2B2 | 1700.2 | 0 | 3.97 | 40.8 | 47 | 1152 | 0 | −2.10 |
| 040914C2B1 | 1700.4 | 0 | 3.99 | 42.3 | 46 | 1153 | 0 | −2.09 |

TABLE 2-continued

| | Actual Beaker Addition Amounts (g) | | | Flake Analytical Results | | | | |
|---|---|---|---|---|---|---|---|---|
| Batch Number | Salt | SHP 5% Solution | Acetic Acid Solution | RV | NH$_2$ (μeq/g) | Acetic (ppm) | Phosphorus (ppm) | YI |
| 040714C2B1 | 1700.17 | 1.52 | 3.96 | 45.9 | 40.8 | 1242 | 24 | −4.04 |
| 041114C2B1 | 1700.42 | 1.52 | 3.97 | 45.6 | 41.2 | 1235 | 24 | −4.76 |
| 041014C2B1 | 1700.2 | 2.77 | 3.97 | 48.2 | 42 | 1435 | 45 | −5.33 |
| 041614C2B1 | 1700.0 | 2.76 | 3.96 | 46.3 | 40.8 | 1242 | 48 | −4.98 |
| 040814C2B2 | 1700.22 | 4.02 | 3.97 | 46.99 | 40.1 | 1149 | 69 | −5.13 |
| 041414C2B2 | 1700.67 | 3.99 | 3.96 | 47.57 | 41.1 | 1278 | 68 | −6.27 |

Figure 4:
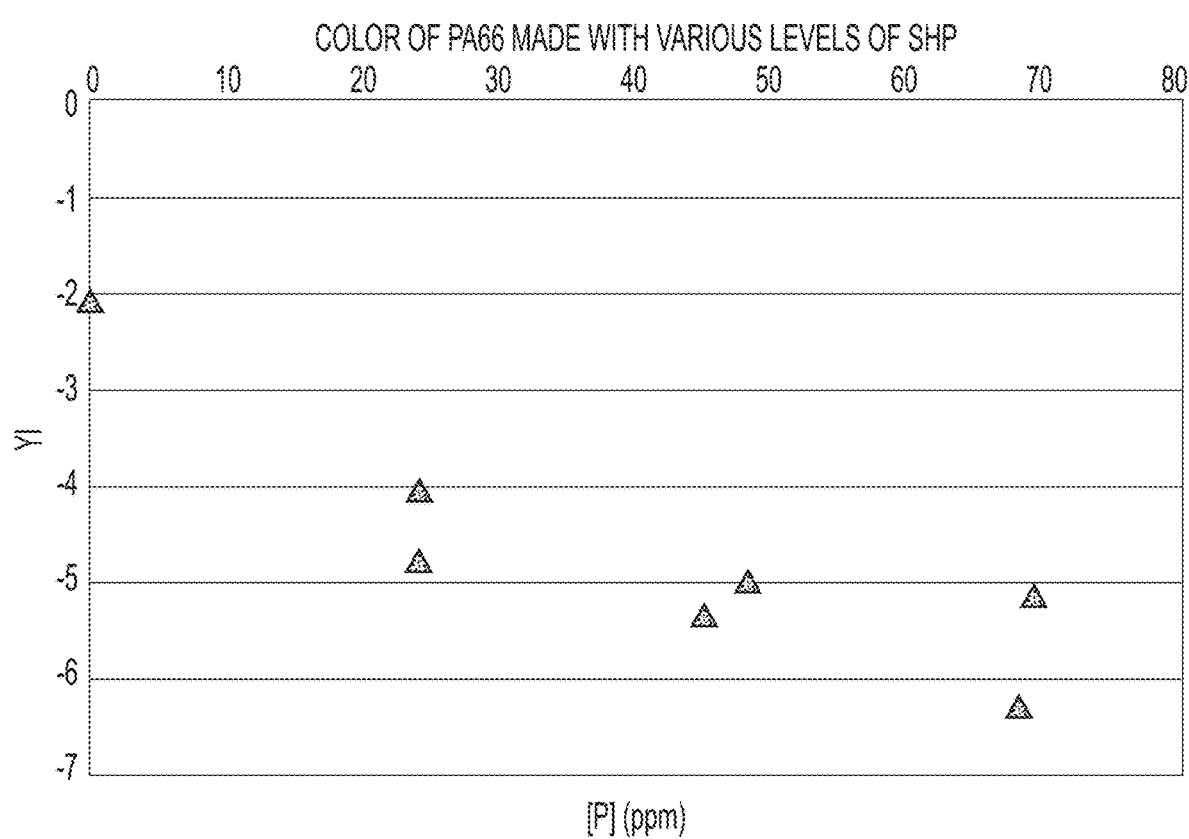
FIG. 4 illustrates the effect of phosphorus (SHP) levels on the color (YI) of PA66.

The yellowness index is higher for the zero or low phosphorus containing batches. FIG. 4 illustrates the effect of phosphorus (P) on color of PA66 prepared with varying phosphorus levels. The YI of these materials was unexpectedly observed to change significantly between zero (0) P and about 24 ppm P, and then slightly more at about 45 ppm P and very slightly more at about 69 ppm P. These results clearly and unexpectedly show a diminishing effect of increasing phosphorus content on color at conventionally low phosphorus levels.

Figure 5:
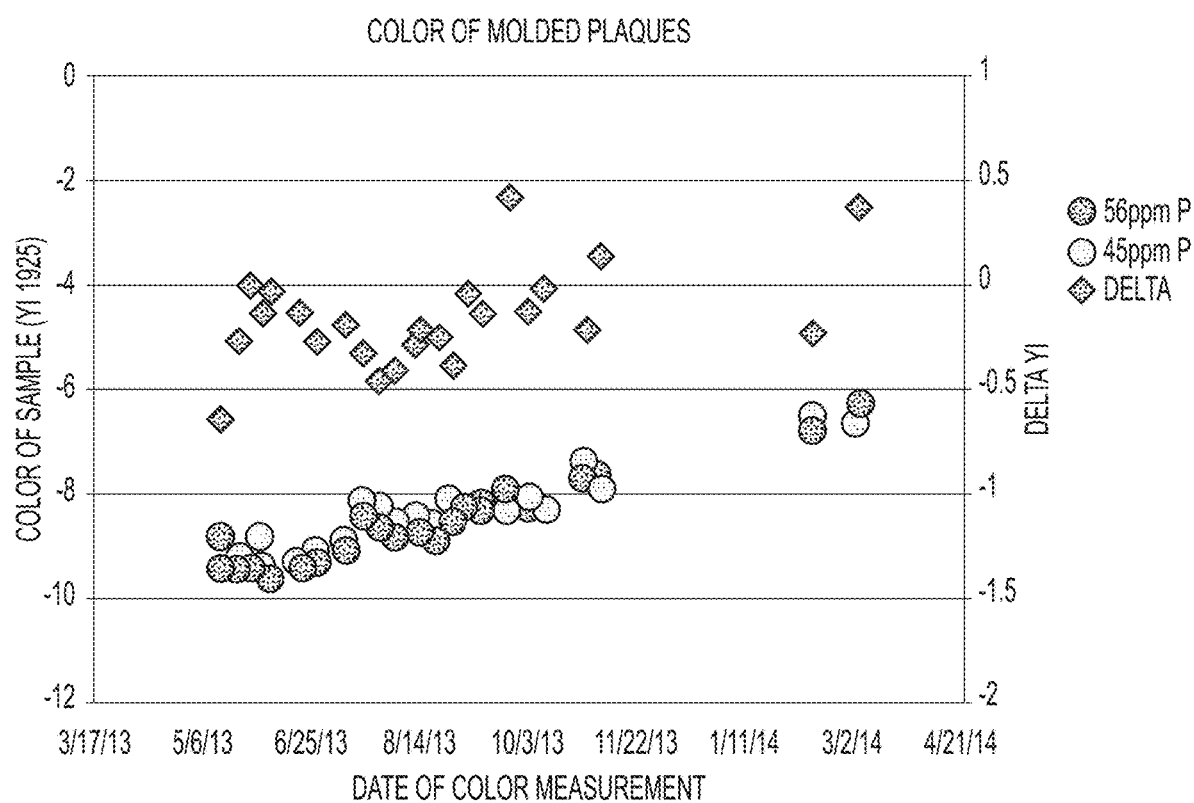
FIG. 5 illustrates the effect of phosphorus (SHP) levels on the color (YI) of molded plaques.

PA66 produced in a continuous polymerization unit was prepared with two different phosphorus content levels using SHP as the phosphorus-containing compound. Plaques were molded from materials containing these two different phosphorus levels and the color of the materials was measured. The color of the plaques were determined weekly or so for several months. FIG. 5 shows the results of the YI measurement of these molded plaques. The difference in color between plaques prepared with 56 ppm phosphorus and plaques prepared with 45 ppm phosphorus is minor, and this difference in color does not significantly change over time. This study demonstrates that the color of PA66 is improved with the addition of SHP, but that once an effective level is reached, there is little or no improvement in color or color stability over time.

Figure 6:
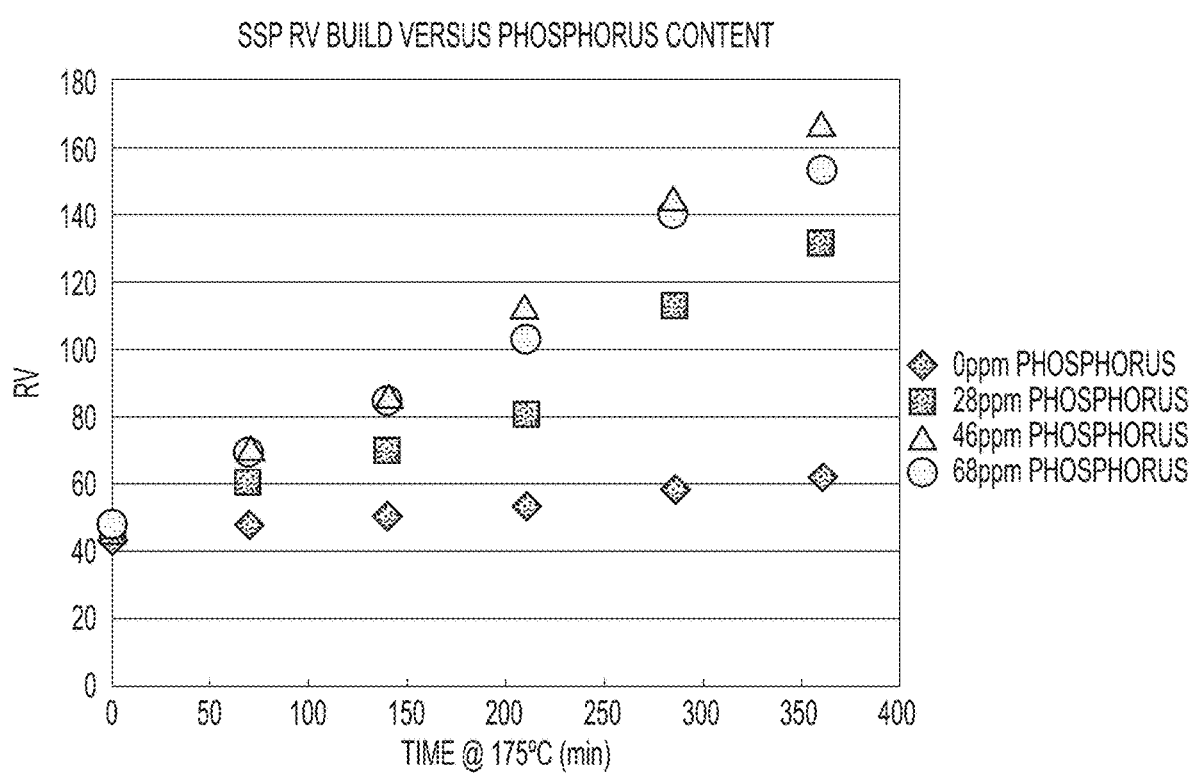
FIG. 6 illustrates the effect of phosphorus content on RV build during SSP.

An additional benefit of employing a phosphorus-containing compound of the present invention in the manufacture of a polyamide such as PA66 is that the phosphorus-containing compound is a catalyst and higher production rates are achievable with it. To answer the question regarding the practical maximum and minimum concentrations of the phosphorus content, the catalytic effectiveness at different phosphorus levels was determined using the lab autoclave samples described in Tables 1 and 2. Each sample was subjected to solid state polymerization at 175° C. Samples were retrieved at incremental times and the relative viscosity or RV was determined for each time. The results are summarized in Table 3 which shows the effect of phosphorus levels on SSP RV build, and are shown graphically in FIG. 6.

TABLE 3

| Batch Number | Phosphorus | Time @ 175° C. (min) | RV |
|---|---|---|---|
| 040914C2B1 | 0 ppm | 0 | 42.26 |
| | | 70 | 47.88 |
| | | 140 | 50.44 |
| | | 210 | 53.43 |
| | | 285 | 58.17 |
| | | 360 | 61.68 |
| 040914C2B2 | 28 ppm | 0 | 45.75 |
| | | 70 | 60.13 |

TABLE 3-continued

| Batch Number | Phosphorus | Time @ 175° C. (min) | RV |
|---|---|---|---|
| | | 140 | 70.21 |
| | | 210 | 80.52 |
| | | 285 | 113 |
| | | 360 | 131.76 |
| 041414C2B1 | 46 ppm | 0 | 47.3 |
| | | 70 | 70.89 |
| | | 140 | 85.81 |
| | | 210 | 112.68 |
| | | 285 | 144.84 |
| | | 360 | 166.43 |
| 041014C2B2 | 68 ppm | 0 | 48.16 |
| | | 70 | 69.14 |
| | | 140 | 84.5 |
| | | 210 | 102.98 |
| | | 285 | 140.05 |
| | | 360 | 153.28 |

The results of the polymerization rate test indicate that there is an increase in RV build rate with the addition of 28 ppm phosphorus and 46 ppm phosphorus, but adding 68 ppm phosphorus does not increase the rate of RV build over that of the sample containing 46 ppm phosphorus. This study shows that there is unexpectedly a practical lower limit of phosphorus content of about 45 ppm phosphorus and a diminished improvement of catalytic activity at about 68 ppm phosphorus.

Figure 7:
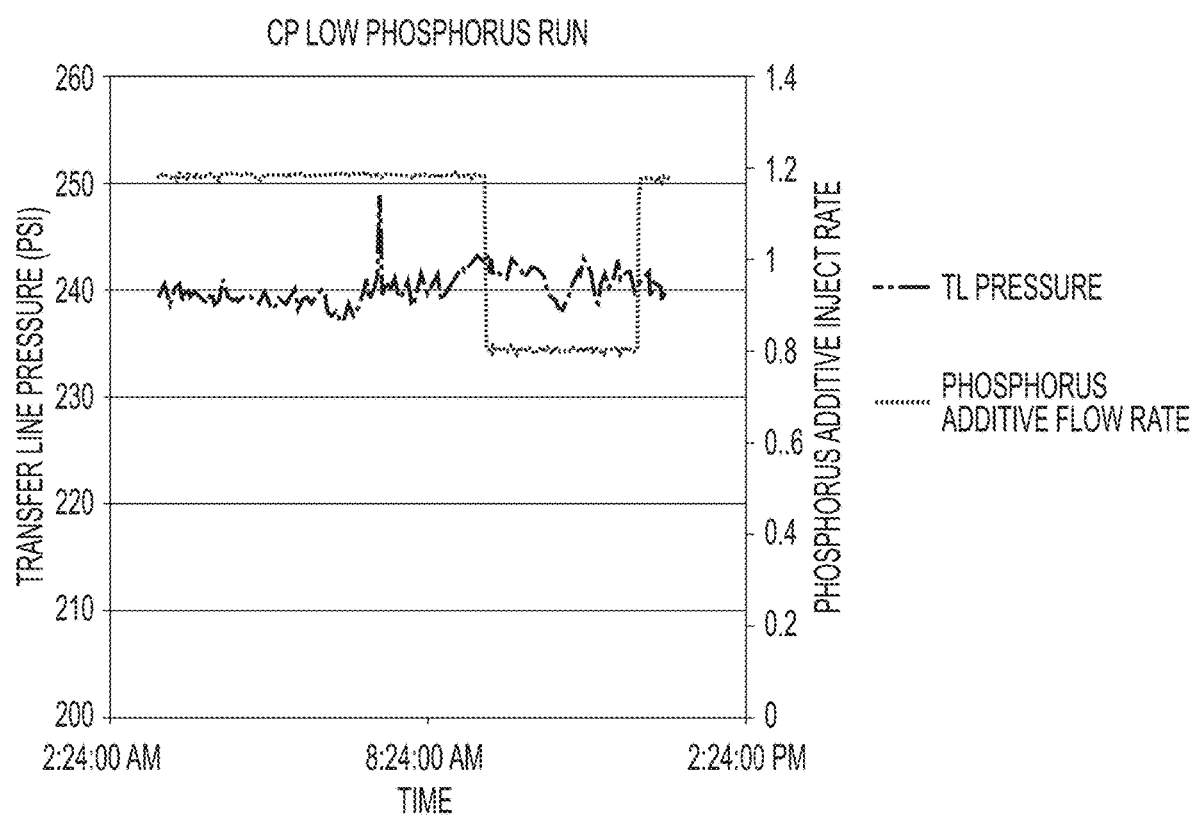
FIG. 7 illustrates the relationship between phosphorus levels and transfer line pressure.

The effectiveness of SHP as a polymerization catalyst has been demonstrated in a continuous polymerization process. The level of phosphorus was reduced from approximately 56 ppm to approximately 40 ppm (i.e., the addition rate was diminished from 1.18 lbs/min to 0.8 lbs/min). The viscosity of the finished polymer can be estimated from the pressure differential in the transfer line directly before the stranding die and pelletization step. In the following test, the amount of phosphorus-containing catalyst was reduced 68% (i.e., from 1.18 lbs/min to 0.8 lbs/min) a change from 56 ppm to approximately 40 ppm phosphorus. The pressure drop in the transfer line did not change over a four hour run period. This run period provides sufficient residence time for the polymer with the reduced level of phosphorus to have made it through the process. No discernible change in transfer line pressure differential was observed during this test. See FIG. 7. The conclusion is that the product melt viscosity (and therefore the product molecular weight) had not changed due to the presence of the reduced amount of phosphorus. The catalytic effectiveness of the phosphorus-containing compound was not changed significantly between approximately 40 ppm P and approximately 56 ppm P.

These examples show that while there is color improvement and catalytic rate improvement with the addition of phosphorus, there is a minimum phosphorus content that is required for effectiveness, and increasing that content above that minimal amount does not significantly improve the effectiveness of the color of the polyamide or the catalytic activity attributed to the phosphorus. There is a clear reduction in the performance of the melt filter screens, and other aspects of nylon polymerization with an increase of phosphorus content. A process improvement has been demonstrated upon changing the target phosphorus content from 56 ppm to 45 ppm.

In an exemplary embodiment, nylon 6,6 is the preferred polyamide and is used to prepare injection molded articles, such as, for example, cable ties, such as for electrical installation. The cable ties can be tested for performance using various techniques, such as those described by Underwriters Laboratory (UL) Standard No. 62275, which describes, for example, how to install a cable tie.

In a particular embodiment, the cable ties were injection molded from one or more nylon 6,6-containing materials, and sealed in moisture proof packaging to keep them 'dry as molded' The cable ties were then installed on, for example, a steel mandrel using an installation tool with an adjustable tensioning capability, set to deliver approximately 35 to 37 lbs of tension during installation before cutting the excess "tail" off of the tie. Installation of the ties is considered successful if the assembled cable tie is installed without any breakage, and remains intact after installation. The installation test is therefore a pass-fail type of test, wherein the success rate (i.e., the percentage of ties passing the installation test) is a measure of the toughness of the nylon 6,6-containing materials comprising the ties, as a fraction of the cable ties failed to be installed successfully.

In an experiment designed to assess the correlation between phosphorus levels in the nylon 6,6-containing materials with the installation success of cable ties comprising such materials, a series of materials with different phosphorus (P) levels were molded into cable ties, the ties collected and maintained in a "dry as molded" state. Several items were molded from each material, consisting of different production lots. A number of cable ties from each item were subjected to an installation test and the fraction of specimens achieving successful installation recorded. The results of three such materials with differing phosphorus levels are summarized in table 4.

TABLE 4

| Material | average success rate | P level (ppm) | n (items) | n (ties) | 95% CI |
|---|---|---|---|---|---|
| Vydyne 21SPC | 96.00 | 45 | 10 | 11884 | 0.36 |
| PIQ621 | 97.78 | 20 | 10 | 7895 | 0.32 |
| 21Z | 98.87 | 0 | 3 | 2393 | 0.42 |

Figure 10:
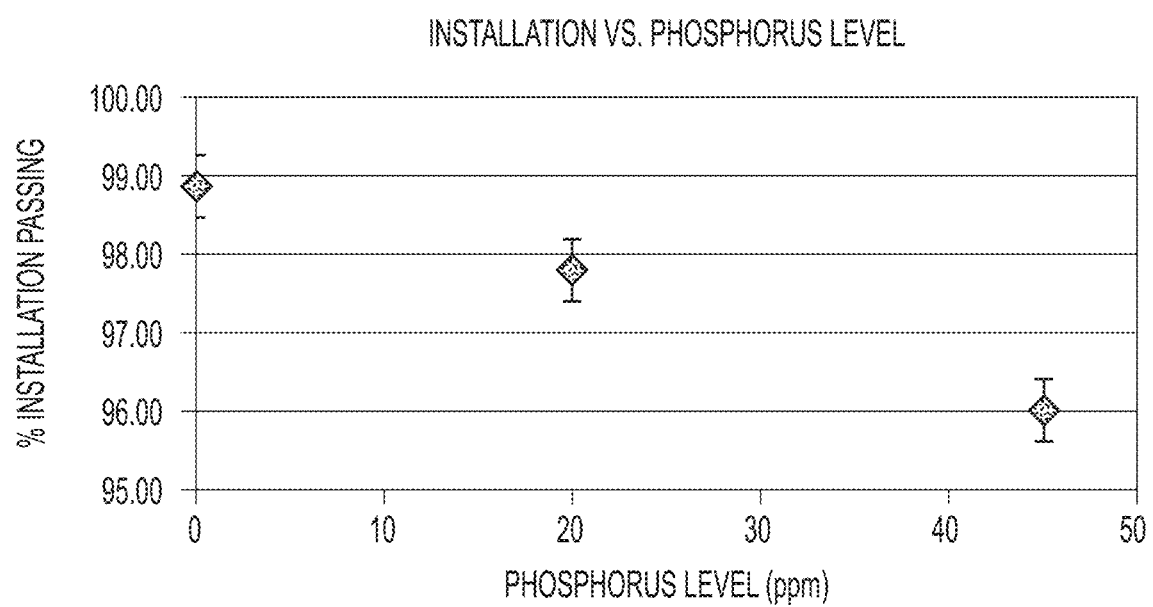
FIG. 10 illustrates the average installation success rate for cable ties comprised of materials containing no phosphorus, materials containing 20 ppm phosphorus and materials containing 45 ppm phosphorus.

P level = phosphorus level
n (items) = number of items tested
n (ties) = number of cable ties tested The results revealed that the average installation success rate is highest for materials containing no phosphorus, intermediate for materials containing 20 ppm phosphorus and lowest for materials containing 45 ppm phosphorus. These results are displayed graphically in FIG. 10. Because the test is a pass-fail type of test, the expectation is that the results follow a binomial distribution. The standard deviation (a) of a binomial distribution is determined from the probability of successful installation (mean fraction passing) and the number of specimens (cable ties) tested. As such, the uncertainty associated with a measurement can be decreased by increasing the number of specimens tested. The 95% confidence interval (CI) is determined to be +/−1.96× the standard deviation as indicated below:

$\mu$ (mean)=mean fraction passing (pbar)

$\sigma$ (std. dev.)=$\sqrt{\{(pbar*(1-pbar))/n\}}$ pbar's 95% CI=pbar+/−1.96$\sigma$ The high number of specimens tested and the high probability of passing the test allows for a high degree of confidence—approximately 0.4%—which is sufficient to allow a statement that the difference in performance between the three tested materials is significant at the 95% confidence interval.

Figure 8:
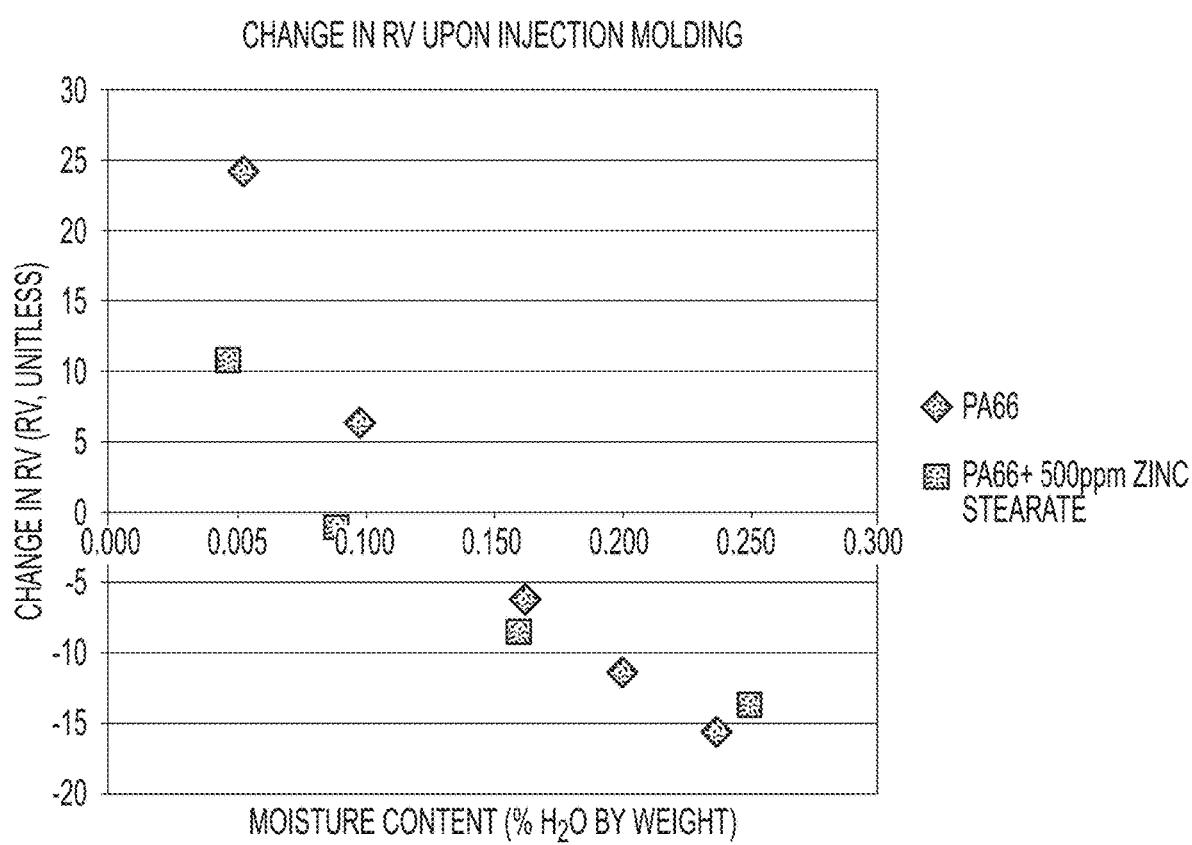
FIG. 8 illustrates the change in RV upon injection molding of PA66 containing a phosphorus-containing compound.

The potential of a phosphorus-containing compound for increasing the RV or molecular weight of nylon 6,6 during injection molding is well known. Two conventional approaches described in the literature for controlling RV build during injection molding are the incorporation into the nylon melt either before or during polymerization of a (divalent) metal that deactivates the catalyst. See, e.g., U.S. Pat. Nos. 8,501,900 and 5,929,200. The problem with this approach is that although the incorporation of the metal-containing compound reduces the catalytic effect of the phosphorus-containing compound, it also interferes with the positive aspect of accelerated polymerization which in turn improves productivity. In a second approach, the use of so-called end group cappers such as acetic acid has been described. The problem with the end group cappers approach is that it is not very effective. In the following examples, it is shown that the application of a metal-containing compound external to the molding resin unexpectedly provides superior control of molecular weight or RV build during injection molding. The application of this effective catalytic control is applied post polymerization of the polyamide product so that the full catalytic effect of the phosphorus is enjoyed throughout the polymerization of the product. A study was conducted where a polyamide 6,6 pellet was injection molded at a variety of moisture levels, and the difference in RV or molecular weight build is determined for each moisture condition. FIG. 8 shows that at lower moistures, the change in RV is greater than 20 units, whereas with the addition to the external surface of the pellet a metal-containing compound, in this case 500 ppm zinc stearate, causes the material to be less reactive and exhibit a change in RV under low moisture conditions of less than 11 RV units.

Figure 9:
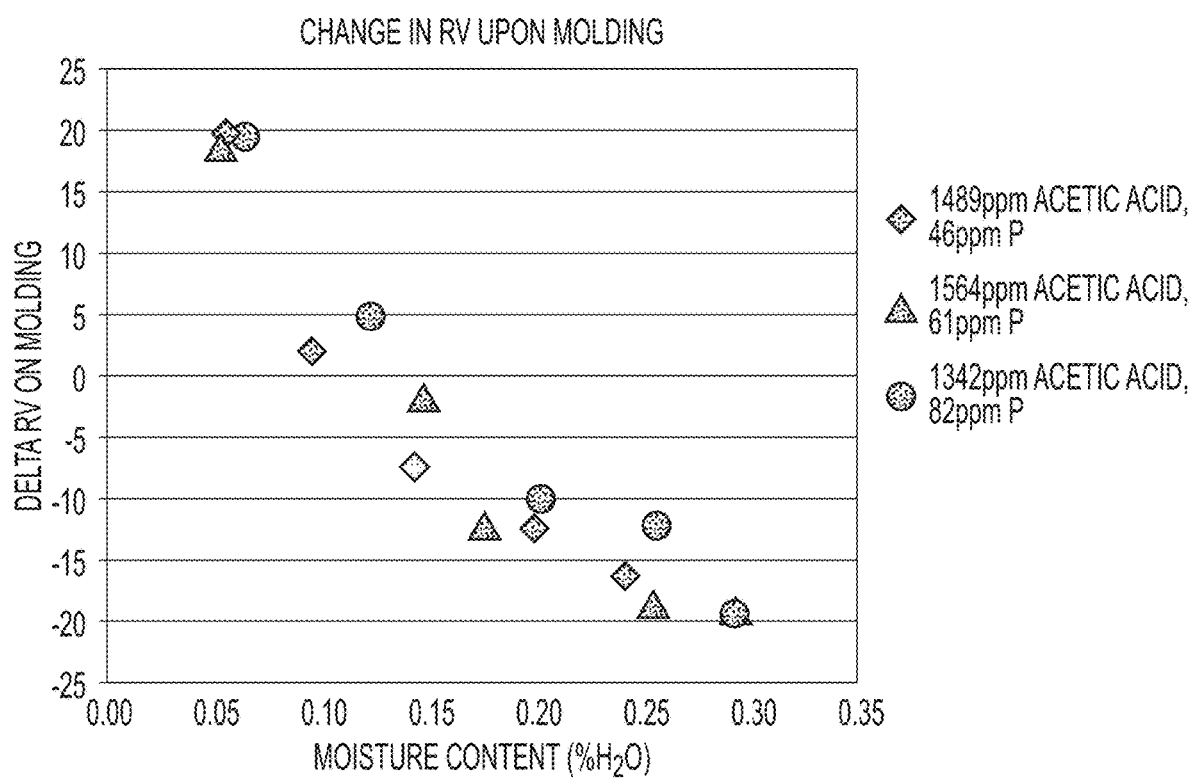
FIG. 9 illustrates the change in RV upon injection molding of PA66 containing a phosphorus-containing compound and end capped with acetic acid.

In another study, the effect of phosphorus levels and acetic acid end capping was demonstrated. As shown in FIG. 9, the change in RV upon injection molding was greater than 16 RV units, and approaching 20 RV units for samples containing 1300 to 1500 ppm acetic acid. The use of acetic acid end cappers is therefore not as effective for controlling RV build ion injection molding compared to the addition of a metal-containing compound.

All published documents (e.g., patents, journal articles, books) cited herein are incorporated by reference in their entireties.

The invention claimed is:
1. A low-color polyamide comprising:
a phosphorus-containing compound, wherein the phosphorus-containing compound contains 25 to 50 ppm of phosphorus and 1,200 to 1,800 ppm of a carboxylic acid,
where the polyamide has a yellowness index (YI) of −4 to −9, where the polyamide has a relative viscosity (RV) range of 40 to 80, and where an amount of phosphorous greater than 50 ppm increases the probability of phosphate plate out in equipment used to prepare or process the polyamide.

2. The polyamide according to claim 1, wherein the carboxylic acid is selected from the group consisting of acetic acid, propionic acid and benzoic acid.

3. The polyamide according to claim 1, wherein the phosphorus-containing compound is hypophosphorus acid or a salt thereof.

4. The polyamide according to claim 1, wherein the polyamide has a RV in a range of 40 to 50.

5. The polyamide according to claim 1, wherein the polyamide is nylon 6,6.

6. The polyamide according to claim 1, further comprising at least one selected from the group consisting of glass fibers, waxes, minerals, carbon fibers, chain terminators, viscosity modifiers, plasticizers, heat stabilizers, UV stabilizers, colorants, impact modifiers, flame retardants, delusterants, fillers, antimicrobial agents, antistatic agents and optical brighteners.

7. The polyamide according to claim 1, further comprising a metal stearate present in an amount of 250 to 1500 ppm on a surface of the polyamide.

8. The polyamide according to claim 7, wherein the metal stearate is selected from the group consisting of aluminum, iron, lead, lithium, magnesium, sodium and potassium stearates.

9. The polyamide according to claim 7, wherein the metal stearate is aluminum distearate.

10. An article comprising the polyamide according to claim 1.

* * * * *